(12) United States Patent
Kim

(10) Patent No.: US 6,396,166 B1
(45) Date of Patent: May 28, 2002

(54) DATA PROTECTIVE RECEPTACLE WITH POWER SAVING FUNCTION

(75) Inventor: Hyung-Kwang Kim, 1201 Hans Tower, 46-5 Guro 5-dong, Guro-ku, Seoul 152-055 (KR)

(73) Assignees: Jinnes Technologies, Inc.; Hyung-Kwang Kim, both of (KR)

( * ) Notice: Subject to any disclaimer, the term of this patent is extended or adjusted under 35 U.S.C. 154(b) by 0 days.

(21) Appl. No.: 09/448,415

(22) Filed: Nov. 23, 1999

(30) Foreign Application Priority Data

Sep. 22, 1999 (KR) .............................................. 99-41161

(51) Int. Cl.[7] .................................................. H02J 3/06
(52) U.S. Cl. .......................... 307/38; 307/112; 307/116; 307/125; 307/126
(58) Field of Search ........................... 307/38, 126, 112, 307/116, 125; 361/42

(56) References Cited

U.S. PATENT DOCUMENTS

| | | | |
|---|---|---|---|
| 4,969,833 A | | 11/1990 | Lindow et al. |
| 5,085,591 A | | 2/1992 | Warren, Sr. et al. |
| 5,270,576 A | * | 12/1993 | Kahle .......................... 307/131 |
| 5,721,934 A | * | 2/1998 | Scheurich .................... 395/750 |
| 5,793,587 A | * | 8/1998 | Boteler .......................... 361/42 |
| 5,844,326 A | * | 12/1998 | Proctor et al. ................. 307/34 |
| 5,847,913 A | * | 12/1998 | Turner .......................... 361/93 |

* cited by examiner

Primary Examiner—Josie Ballato
Assistant Examiner—Robert L. DeBeradinis
(74) Attorney, Agent, or Firm—Dinesh Agarwal, P.C.

(57) ABSTRACT

The present invention relates to a data protective receptacle with the power saving function to accomplish the power saving by getting a sub-receptacle to be automatically controlled so that it may be on or off by a main receptacle. Since this invention can get the power for driving peripheral appliances automatically to be off when the main power for the computer system gets to be off, it can reduce the consumption current thereof while it stands by. Also, this invention gets both alternating-current (AC) power lines to be off when the main system gets to be off, and thereby, it can cut off any leaking current flowing between one power line and the ground line so that the power consumption may be reduced while the system stands by.

2 Claims, 2 Drawing Sheets

DATA PROTECTIVE RECEPTACLE WITH POWER SAVING FUNCTION

BACKGROUND OF THE INVENTION

1. Field of the Invention

The present invention relates to a data protective receptacle with the power saving function, and particularly, to a data protective receptacle with the power saving function to accomplish the power saving by getting a sub-receptacle to be automatically controlled so that it may be on or off by a main receptacle.

More particularly, this invention relates to the data protective receptacle with the power saving function to enable the power source of any peripheral appliance (such as a printer, a monitor, a scanner, etc.) to be automatically controlled by the power switch of any ordinary office appliance or any home appliance such as a video, an audio or a main system of any computer, and further to enable the system to be protected against any thunderbolt, overcurrent or overvoltage.

2. Description of the Related Art

Generally, a computer system comprises a main system and a monitor which is a peripheral appliance. And in many cases, a printer and/or a scanner are also additionally connected with the system as a peripheral appliance.

As for the power supply of the computer system, the monitor power is supplied from the main system or any separate power source, and the printer power or the scanner power is also supplied from the separate power source.

So, even while the computer is not used or the computer power is turned off, the standby power is supplied to each peripheral appliance at all times unless the power supply to each peripheral appliance connected with the computer is separately cut off. Thus, the waste of power resulting therefrom is great.

Also, since the ordinary power switch used in the computer system or other electrical appliances controls the power supply by getting only one of the two power supply lines (in case of AC) to be on or off, it has such a weak point that any leaking current flows between the power line which is not off and the ground line, causing the power to be wasted.

SUMMARY OF THE INVENTION

Therefore, this invention is created to solve all problems caused by the power switch used in the conventional computer system or the ordinary electrical product, as described above.

That is to say, the object of this invention is to provide the data protective receptacle with the power saving function to accomplish the power saving by getting the sub-receptacle to be automatically controlled so that it may be on or off by the main receptacle.

More specifically, the object of this invention is to provide the data protective receptacle with the power saving function which can automatically control the power supply to the peripheral appliance (such as a printer, a monitor, a scanner, etc.) by the power switch of the main system (computer) and further can protect the system even against any thunderbolt, overcurrent or overvoltage.

In order to accomplish the said object, the data protective receptacle according to the invention comprises:

a control means connected with one of the alternating-current power lines which are supplied to the main system of the computer and peripheral appliances thereof, for sensing whether any leaking current exists and generating a signal for controlling the power supply to the peripheral appliances and a signal for controlling the power supply to the main system, depending on whether such sensed leaking current exists;

a power switch means for getting each of the said AC power lines to be on or off at any time intervals according to the main system power control signal as generated by the said power control means; and a peripheral appliance power control means for sensing the said leaking current, transmitting the sensed current to the said power control means and further controlling the AC power supplied to the said peripheral appliances according to the peripheral appliance power control signal as generated by the said power control means.

Also, the said power control means comprises:

a diode for bridge-rectifying the leaking current sensed by the said peripheral appliance power control means;

an amplifier for amplifying the direct current voltage which is bridge-rectified by the diode to a given level;

a first resistance and a second resistance for setting a reference voltage by changing the level of the DC voltage supplied from the outside;

a comparator for comparing the said set reference voltage with the said voltage outputted from the amplifier and outputting the comparative results; and a SCR for controlling the current of a relay coil according to the signal outputted from the comparator.

BRIEF DESCRIPTION OF THE INVENTION

REFERENCE NUMBERS FOR ESSENTIAL ELEMENTS SHOWN IN THE DRAWINGS

10: Power Switch Section
20: Surge Protection Section
30: Power Supply Section
40: Power Control Section
50: Peripheral Appliance Power Control Section The preferred embodiments of the present invention are described below in detail in conjunction with the attached drawings.

Figure 1:
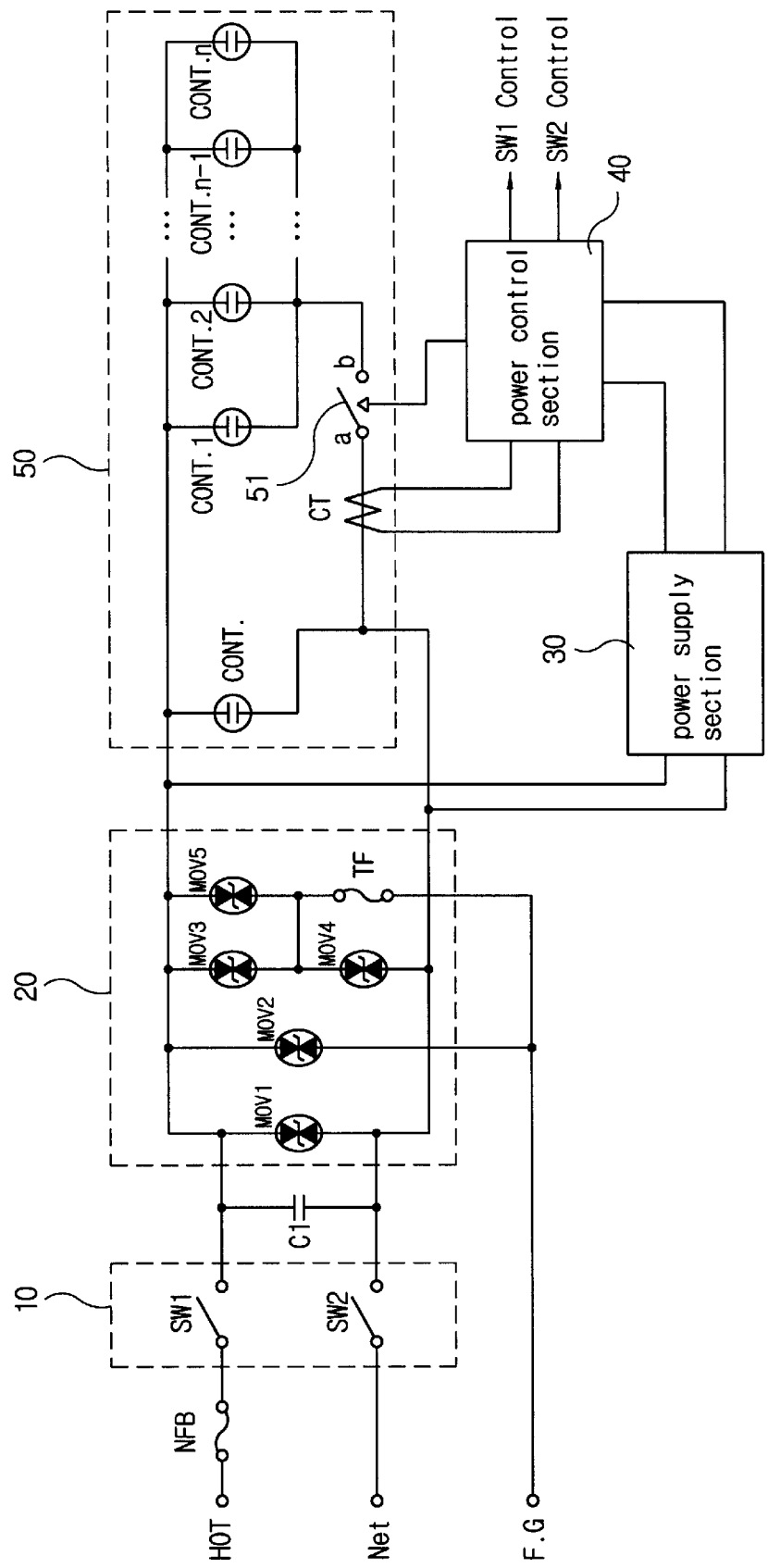
FIG. 1 is a circuit diagram of the data protective receptacle with the power saving function according to the present invention.

FIG. 1 is a circuit diagram of the data protective receptacle with the power saving function according to the present invention.

The element referred to as "NFB" is a fuse which is automatically cut off to prevent the system from being damaged when any overcurrent or overvoltage takes place. The reference number "10" is the power switch section for controlling the inputted power of the system by the on/off operation of the first switch (SW1) and the second switch (SW2) provided in the AC power lines respectively. The reference number "20" is the surge protective section for cutting off any surge voltage from being supplied to any back terminal and thereby protecting against any loss of data due to the surge voltage.

The reference number "30" is the power supply section for rectifying the AC power through the surge protective section (20), and thereby converting the power to a plurality of DC voltages and further supplying the said voltages to each terminal of the system. The reference number "40" is the power control section connected with one of the AC power lines which are supplied to the main system and peripheral appliances thereof, for sensing whether any leaking current exists and generating a signal for controlling the power supply to the peripheral appliances and a signal for controlling the power supply to the main system, depending on whether such sensed leaking current exists.

The reference number "50" is the peripheral appliance power control section for detecting the said leaking current, transmitting the detected current to the said power control section (40) and further controlling the AC power supplied to the peripheral appliances according to the peripheral appliance power control signal as generated by the power control section (40).

According to the above embodiment, when the first switch (SW1) and the second switch (SW2) in the power switch section (10) are on, the inputted AC power is supplied to the system, and the supplied AC power is further supplied to the back terminal after the surge voltage is removed by each surge protection elements (MOV1–MOV5) in the surge protection section (20).

The power supply section (30) makes full-wave rectification of the AC power supplied to the back terminal so that it converts the AC power to the DC voltage and further converts the said DC voltage to a plurality of DC transformed voltages as required by the system. Further, the transformed DC voltages are supplied to each terminal of the system (main system).

Like this, with the driving power being supplied to each terminal of the system, a micro current sensible element (CT) in the peripheral appliance power control section (50) is connected with one of the AC power lines supplied to the peripheral appliances so that it senses whether any leaking current from the main receptacle exists, and further transmits such sensed results to the power control section (40).

The said power control section (40) generates a signal for controlling the power supply to the peripheral appliance and a signal for controlling the power supply to the main system according to whether the leaking current sensed by the said micro current detection element exists.

Figure 2:
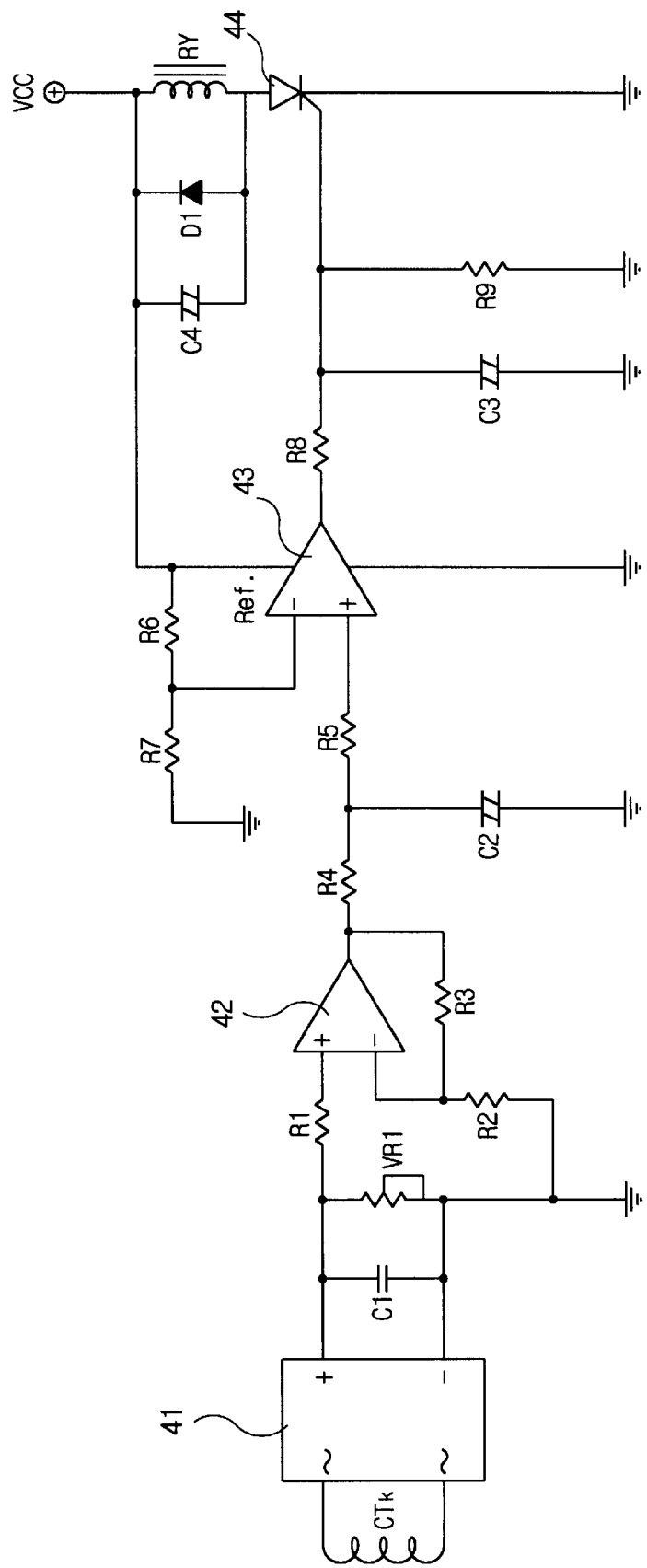
FIG. 2 is a circuit diagram showing one embodiment of the power control section of FIG. 1.

As shown in FIG. 2, the said power control section (40) comprises a diode (41) for bridge-rectifying the leaking current sensed by the said peripheral appliance power control means (50); an amplifier (42) for amplifying the DC voltage bridge-rectified by the said diode (41) to a given level; a first resistance (R6) and a second resistance (R7) for setting a reference voltage (Ref.) by changing the level of the DC voltage supplied from the outside; a comparator (43) for comparing the said set reference voltage with the said voltage outputted from the amplifier (42) and outputting the comparative results; and a SCR (44) for controlling the current of a relay coil (RY) according to the signal outputted from the said comparator (43) and generating the said peripheral appliance power control signal according to the outputted results from the said comparator (43).

The said power control section (40) bridge-rectifies any leaking current sensed by the diode (41), and amplifies the rectified current to a given level through the amplifier (42). Further, the comparator (43) compares the reference voltage set by the resistances (R6) and (R7) with the outputted voltage of the said amplifier (42), and further controls the power supply to the peripheral appliance and the power supply to the main system by controlling the SCR (44) according to the comparative results.

Specifically, when the main power is supplied, any leaking current flows to the main receptacle (CONT.) in the peripheral appliance power control section (50), and so, the micro current sensible element (CT) gets to sense the leaking current. Therefore, any outputted voltage gets to exist even in the diode (41). Further, such outputted voltage is amplified to a given level by the amplifier (42) and then inputted to a non-inversion terminal (+) in the comparator (43). Meanwhile, the reference voltage (Ref.) set by the resistances (R6) and (R7) is inputted to an inversion terminal (–) in the comparator (43). In case any leaking current is sensed, the voltage inputted to the non-inversion terminal (+) is higher than that inputted to the inversion terminal (–) so that the output gets to be high. The SCR (44) gets to be driven by the said outputted high signal, and thereby, any current gets to flow to the relay coil (RY). When the current flows to the relay coil (RY), the relay switch (51) in the peripheral appliance power control section (50) gets to be on (the condition that Contact "a" is connected with Contact "b"). Then, the AC power is also supplied to each receptacle (CONT. 1–CONT. n) to supply the power to the peripheral appliances, and thereby the driving voltage gets to be supplied to the peripheral appliances.

In this case, the first switch (SW1) and the second switch (SW2) in the power switch section (10) for controlling the power supply to the main system has also got to be on.

Meanwhile, when the main power is cut off (that is to say, the power switch of the main system is off), any leaking current does not flow to the main receptacle (CONT.) in the peripheral appliance power control section (50) and accordingly, there is no current outputted from the micro current sensible element (CT). Further accordingly, there is no voltage outputted from the diode (41). Likewise, the voltage outputted from the amplifier (42) gets to be low so that it is inputted to the non-inversion terminal (+) of the comparator (43). Meanwhile, the reference voltage (Ref.) set by the resistances (R6) and (R7) is inputted to the inversion terminal (–) of the comparator (43). In case any leaking current is not sensed, the voltage inputted to the non-inversion terminal (+) is lower than that inputted to the inversion terminal (–) so that the output gets to be low. The SCR (44) gets to be off by the said outputted low signal, and thereby, any current does not flow to the said relay coil (RY). If any current does not flow to the said relay coil (RY), the relay switch (51) in the peripheral appliance power control section (50) also gets to be off (the condition that Contact "a" is not connected with Contact "b"). Then, the supply of the AC power to each receptacle (CONT. 1~CONT. n), which supplies the power to each peripheral appliance, gets to be also cut off.

That is to say, when the main switch of the main system of the computer gets to be off, the power supply to the peripheral appliance connected therewith gets to be automatically cut off so that any waste of power is prevented.

The conventional method of cutting off the power supply is to get only one of the two AC power lines to be off. When the AC power is cut off by such conventional method, the leaking current gets to flow between the other AC power line which is not off and the ground line so that the waste of power takes place.

However, the present invention generates the signal for controlling the power supply to the main system to enable the first power switch (SW1) and the second power switch (SW2) in the power switch section (10) to be off at any given time intervals unless the power control section (40) senses any leaking current.

According to the main system power control signal as generated so, both the first power switch (SW1) and the second power switch (SW2) in the power switch section (10) get to be off at the given time intervals.

For example, with the first power switch (SW1) being first off, the second power switch (SW2) gets to be off after a given time.

If both AC power lines get to be off in the said manner, it is possible to prevent any leaking current from flowing between one AC power line which is not off and the ground line when the other AC power line is off in the conventional system and as a result, any waste of power can be reduced greatly.

As stated above, the data protective receptacle with the power saving function according to the present invention can automatically get the driving power supplied to the peripheral appliances to be off when the main power is off in the computer system so that it has the advantage to reduce any waste of power greatly.

The said data protective receptacle with the power saving function has also the advantage that by getting both AC power lines to be off when the system gets to be off, it is possible to prevent any leaking current from flowing between one AC power line which is not off and the ground line when the other AC power line is off in the conventional system so that any waste of power can be reduced greatly.

What is claimed is:

1. A data protective receptacle with power saving function, comprising:

power control means connected with one of two alternating-current power lines supplying power to a main device and at least one peripheral appliance, said power control means for sensing a presence of a leakage current between a peripheral appliance and one of the two power lines and generating a signal to control the power being supplied to said at least one peripheral appliance and a signal for controlling the power supplied to the main device;

a diode for bridge-rectifying leakage current sensed by said peripheral appliance power control means;

an amplifier for amplifying the direct current voltage which is bridge-rectified by said diode to a given level;

a first resistance and a second resistance for setting a reference voltage by changing the level of the DC voltage supplied from the outside;

a comparator for comparing said set reference voltage with said voltage outputted from the amplifier and outputting the comparative results;

a SCR for controlling the current of a relay coil according to the outputted signal from said comparator and generating said peripheral appliance power control signal according to the outputted results from said comparator;

power switch means for controlling the AC power lines to be on or off according to said main system power control signal as generated by said power control means;

a peripheral appliance power control means for controlling the AC power supplied to said at least one peripheral appliance according to the peripheral appliance power control signal as generated by said power control means;

said power switch means comprising, respectively, in a hot line and a neutral line of the AC power lines and including a first power switch and a second power switch which switches can be on or off separately according to the leakage current of the main system power control signal outputted by said power control means; and said power switch means causing said first power switch and said second power switch to be on or off at any time intervals sequentially when the power control signal generated by said power control means is the on-signal.

2. The data protective receptacle with power saving function according to claim 1, wherein:

said peripheral appliance power control means comprises a leakage current sensing element provided in the hot line of said AC power lines for sensing any leakage current from the main receptacle;

a relay switch connected serially with said leakage current sensing element for supplying or cutting off two lines of the hot line and the neutral line of the AC power supplied to said peripheral appliance according to the peripheral appliance power control signal generated by said power control means; and a plurality of sub-receptacles for supplying or cutting off the AC power supplied to the peripheral appliance according to the on/off operation of said relay switch.

* * * * *